July 4, 1944.   C. L. MOLNAR   2,352,855
APPARATUS FOR MAKING COMB UNITS AND THE LIKE
Original Filed Aug. 1, 1940   4 Sheets-Sheet 1
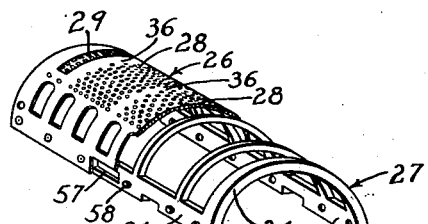
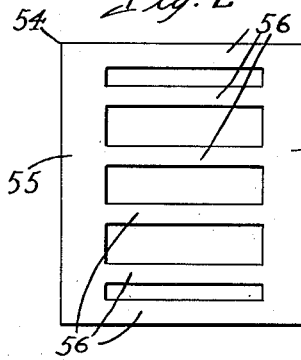
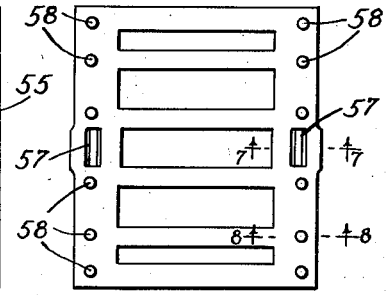
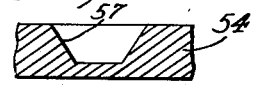
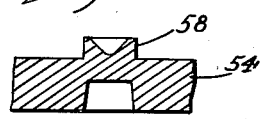
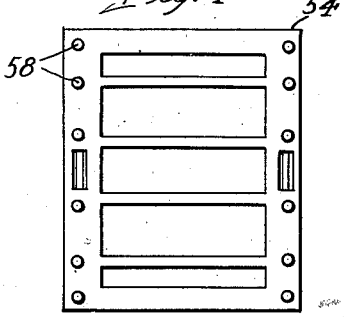
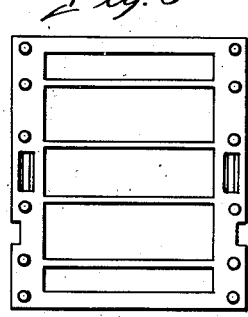
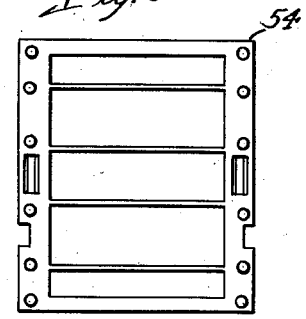
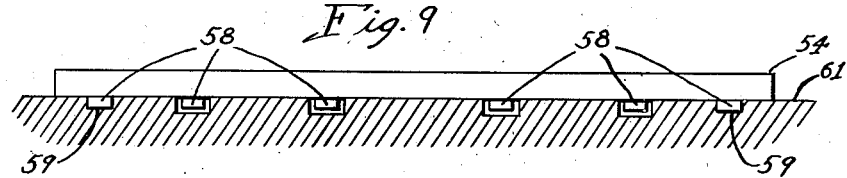
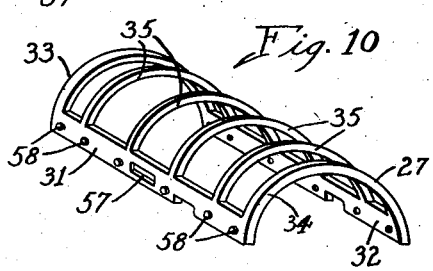
Inventor:
Charles L. Molnar
By McCanna, Winterson & Morsbach
Attys.

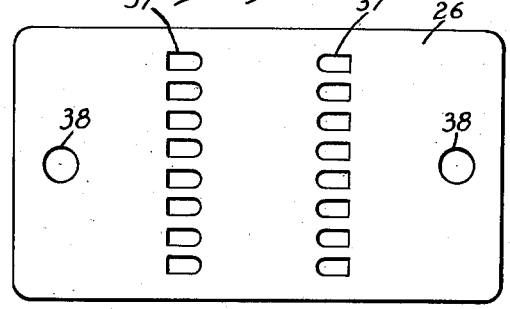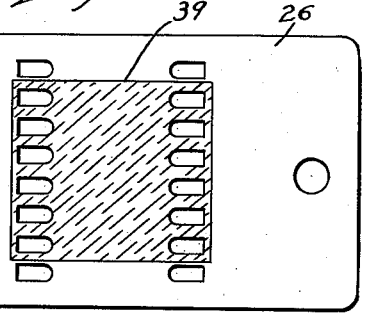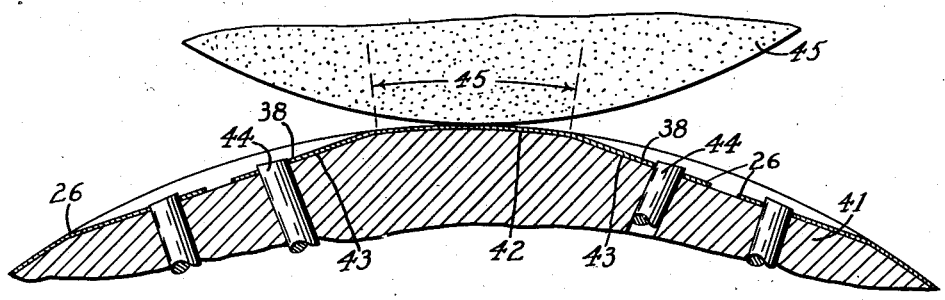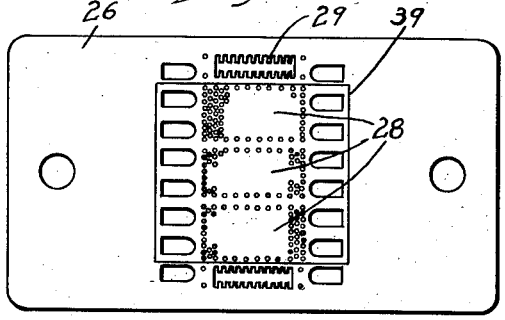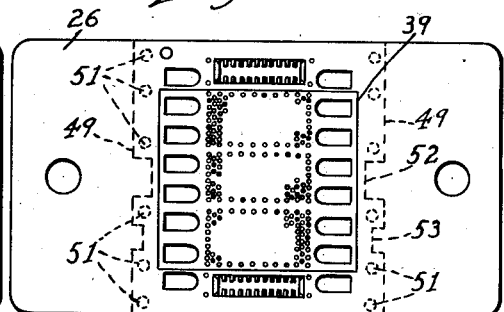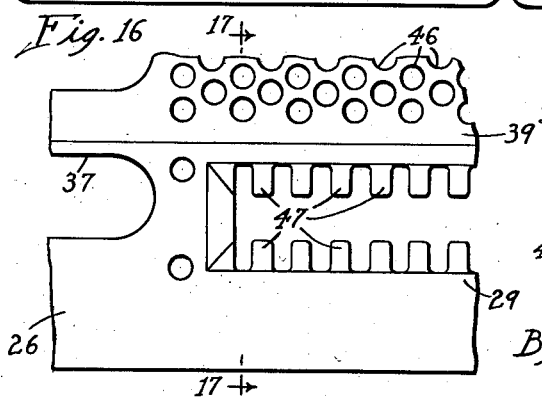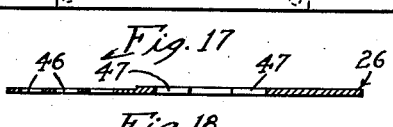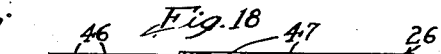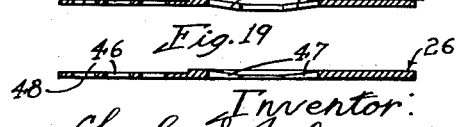

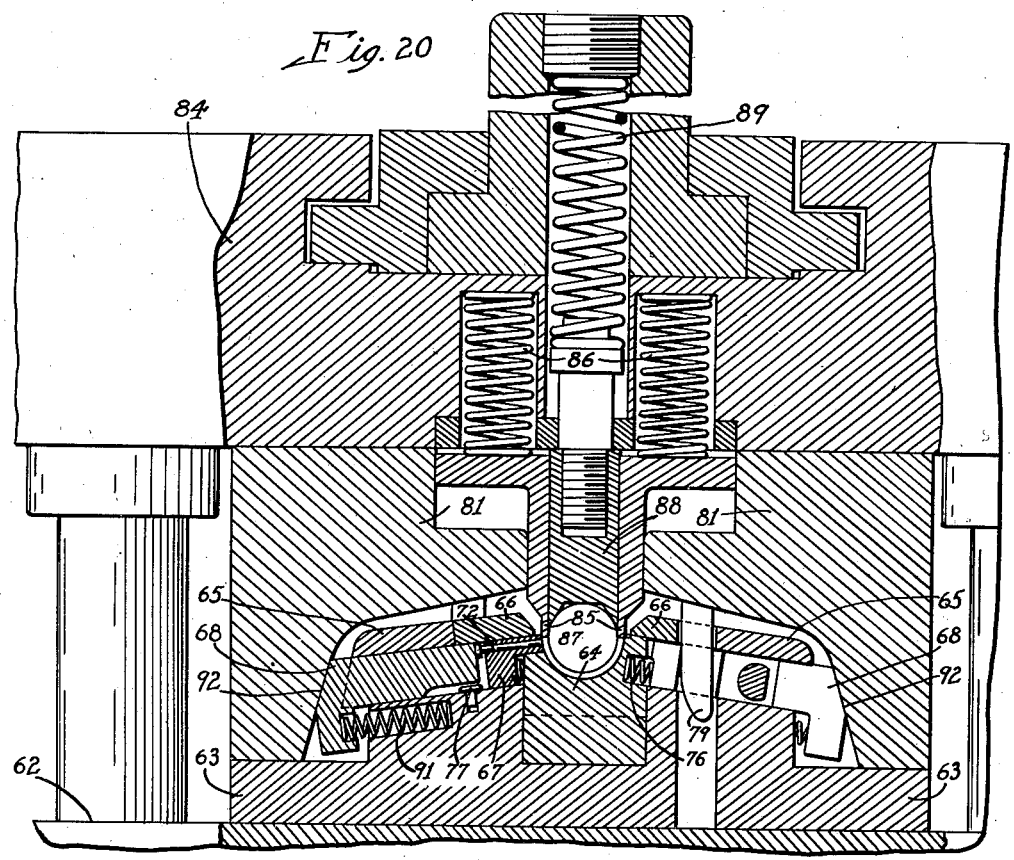
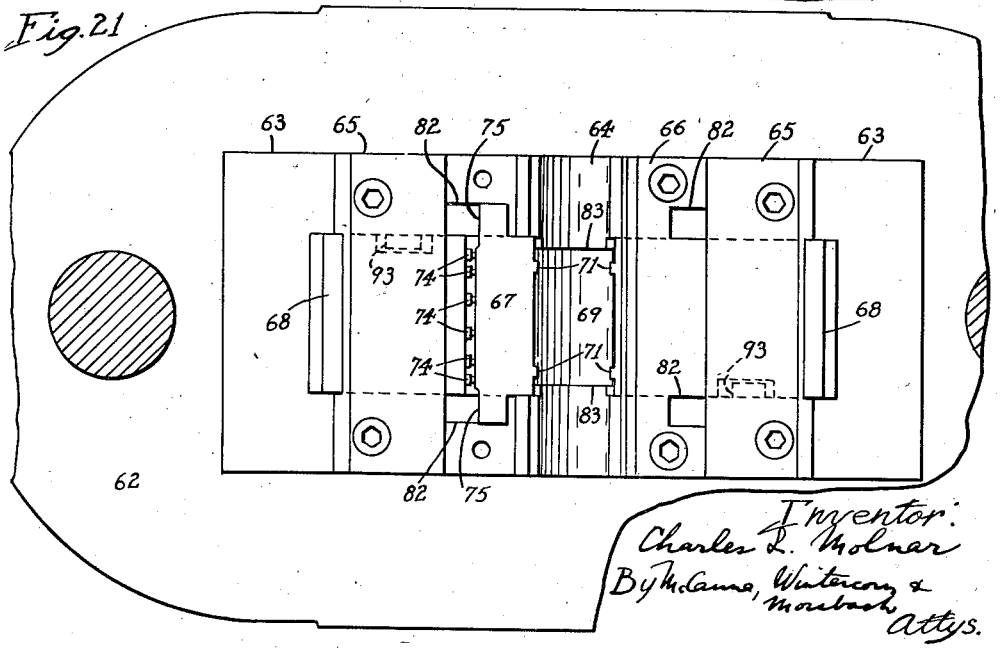

July 4, 1944. C. L. MOLNAR 2,352,855
APPARATUS FOR MAKING COMB UNITS AND THE LIKE
Original Filed Aug. 1, 1940 4 Sheets-Sheet 4
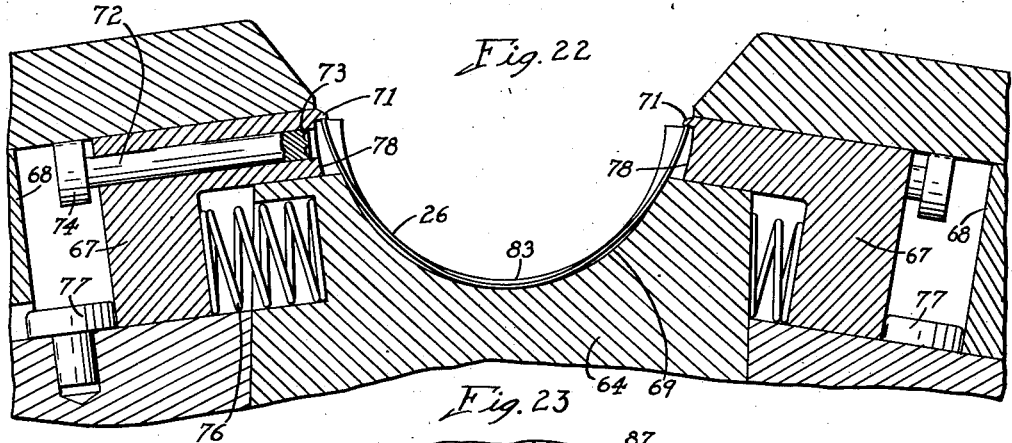
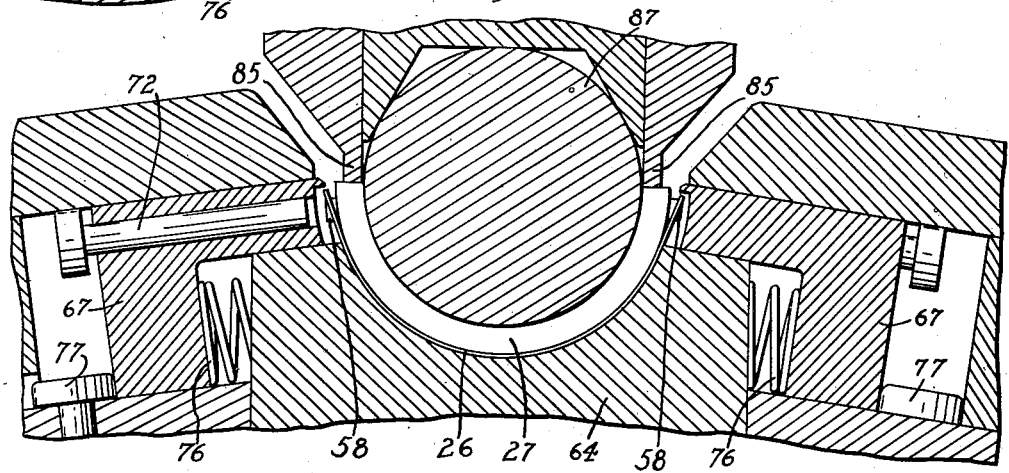
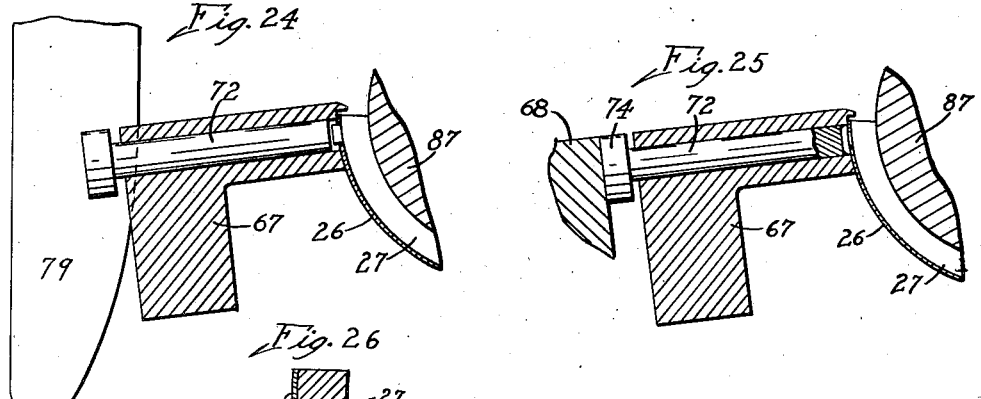
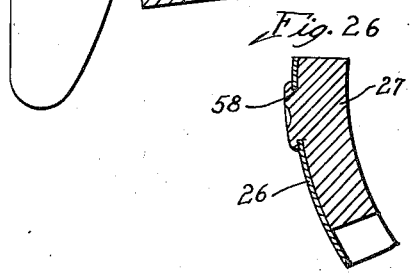
Inventor:
Charles L. Molnar
By McCanna, Wintercorn & Morsbach
Attys.

Patented July 4, 1944

2,352,855

UNITED STATES PATENT OFFICE 2,352,855

APPARATUS FOR MAKING COMB UNITS AND THE LIKE

Charles L. Molnar, Chicago, Ill., assignor to Chicago Flexible Shaft Company, Chicago, Ill., a corporation of Illinois Original application August 1, 1940, Serial No. 349,344, now Patent No. 2,325,205, dated July 27, 1943. Divided and this application February 22, 1943, Serial No. 476,736

11 Claims. (Cl. 76—1)

This application is a division of my application Serial No. 349,344, filed August 1, 1940, now Patent number 2,325,205 dated July 27, 1943, for Method of making parts for comb units and the like.

This invention relates to apparatus for making parts of certain intricate shape characteristics from sheet metal wherein a high degree of precision and permanency in the ultimate shape is desired.

The invention has further reference to the manufacture of a multi-part comb unit which constitutes the stationary shearing member of a dry shaver. A comb unit of this type is disclosed in Patent No. 2,234,891 to John Bruecker, for Shaving implement. Said comb unit is characterized by one part comprising an extremely thin sheet of spring steel perforated to provide hair-receiving openings and cutting edges and another part comprising a supporting frame having arched supporting ribs. These parts are assembled into a unit with the thin comb plate flexed over the arched ribs and conforming to the shape thereof and with the marginal portions of the plate fixedly secured by clamping or interlocking directly to the supporting frame so as to constitute a unitary comb structure. In the operation of a dry shaver of this kind precision of shape of the comb structure and the quality of accurately maintaining its shape are important and highly desired factors. These requirements are difficult to attain partly because the comb is a replaceable unit which must coact with other parts on the shaver proper and partly because the cutting efficiency depends on precision intimate contact between the cutting edges of the comb and the cutter.

Prior to my invention a difficult problem was encountered in the manufacture of a multi-part comb structure of the character described in that known methods of manufacture did not provide the desired degree of accuracy and uniformity in shape of the finished comb structure, nor permanency of such shape. This problem was accentuated because of the intricate shape characteristics of the comb unit and the high degree of precision desired.

The primary object of my invention is, therefore, to provide apparatus for manufacture characterized by certain steps the nature of which will be described more fully hereinafter.

Another object of my invention is to provide, more particularly, improved apparatus for manufacturing a multi-part comb unit of the character described, with the view to attaining greater tensile strength, permanency of form, and economy in the cost of manufacture of such unit.

In furtherance of these objects my invention contemplates certain new and unique manufacturing operations including the making of a comb support of exceptional tensile strength and accuracy of its component parts, improvements in the manufacture of the comb plate particularly in the grinding of the close shaving area thereof, improvements in the manufacture of the comb support, and improved apparatus for assembling the comb plate and the support in a final, permanent unit.

Other objects and attendant advantages will be appreciated by those skilled in this art as the invention becomes better understood by reference to the following description when considered in connection with the accompanying drawings, in which—

Figure 1 is a perspective view, partly broken away, showing a comb unit of the character described;

Figs. 2 to 6, inclusive, are views of the comb support at different stages of manufacture;

Figs. 7 and 8 are enlarged detail sections taken on the section lines 7—7 and 8—8, respectively, of Fig. 3;

Fig. 9 is an enlarged view looking at a longitudinal side of the comb support, showing the manner in which this part is located on a die member during certain operations described later;

Fig. 10 is a perspective view of a finished comb plate showing the blanking and grinding operations, respectively;

Figs. 11 and 12 are face views of the comb plate showing the blanking and grinding operations, respectively;

Fig. 13 is an enlarged section showing a number of comb blanks on a special grinding arbor and a grinding wheel in grinding relation to one of the comb blanks;

Figs. 14 and 15 are face views of the comb blank showing additional operations described later;

Fig. 16 is an enlarged fragmentary view showing the perforations at one corner of the comb plate;

Figs. 17, 18, and 19 are sectional views taken on the section line 17—17 of Fig. 16 showing successive shape characteristics of the comb plate;

Fig. 20 is a fragmentary vertical section through a die assembly comprising upper and lower die members which I have designed for assembling the comb plate and support into a unitary structure;

Fig. 21 is a fragmentary plan view showing the lower die member and its component parts, with one of the parts removed;

Figs. 22 to 25, inclusive, are enlarged fragmentary sections showing certain steps in the die operations described later; and Fig. 26 is a further enlarged detail section through the riveted portion of the comb unit.

While my invention in certain of its phases is adapted for the manufacture of parts other than the comb plate and support herein shown, it will be understood insofar as these broader teachings are concerned that they are here shown for purpose of illustration in connection with the comb unit above identified. It will also be understood that my invention in certain of its phases is directed particularly to the manufacture of a comb unit such as identified, or to a comb structure having at least some of the characteristics of said comb unit.

Referring more particularly to Figs. 1 and 10 it will be observed that the comb unit is made up of a comb plate and a support therefor designated generally by reference numerals 26 and 27, respectively. This comb unit is a replaceable, component part of an electric dry shaver such as disclosed in the Bruecker Patent No. 2,234,891, above mentioned, which operates on the principle covered in the Bruecker Patent No. 2,081,694, granted May 25, 1937. The comb plate 26 here shown embodies certain improvements over that shown in said Bruecker Patent No. 2,234,891, some of which improvements are the subject matter of patents, Nos. 2,234,893, 2,234,894, and 2,234,929.

Prior to my invention the comb unit existed as a structure substantially in the form shown in Figs. 1 and 10, that is, characterized by a comb plate of extremely thin spring steel perforated to provide a number of so-called "close shaving" areas 28 having small closely positioned hair-receiving openings and a so-called "long hair" cutting area 29 at each end having teeth adapted for more readily cutting long hairs as distinguished from the close shaving function of the areas 28, the said support 27 in the form of a skeleton frame having longitudinal side members 31 and 32 joined by arched cross members 33 and 34 at the ends and narrower intermediate members or ribs 35 which are disposed beneath and register with the imperforate areas 36 between the areas 28, the comb plate being flexed to conform to the outer shape of the support and being attached to said support preferably to the longitudinal members thereof. More particularly, the comb plate was clamped or interlocked to said longitudinal members 31 and 32 as claimed in the patent to John Bruecker No. 2,234,893, for Shaving implement. The comb unit structure here shown in which the comb plate is attached to the longitudinal members of the support by a rivet structure is claimed in said Patent No. 2,234,929, for Shaving implement. There are certain steps in the manufacture of said comb plate covered in Patent No. 2,182,067, granted December 5, 1939, to John Bruecker for Process of manufacturing a shaving tool.

Referring now to the manufacture of the comb plate, Figs. 11 to 19, inclusive: In the present embodiment of the invention the plate is of .004" spring steel as distinguished from thinner stock of approximately .002" heretofore used. I employ the thicker stock in order to provide different thicknesses in the areas 28 and 29 above mentioned, but my invention in other respects does not depend upon these areas of different thicknesses. In the present embodiment the plate is blanked to the shape shown in Fig. 11, the openings 37 serving for relief of the cut hair and the openings 38 for holding the blank during certain manufacturing operations. The plate is then reduced in thickness to approximately .002" in a limited area designated by 39, Fig. 12, this area being sectioned to show grinding. In Fig. 13 is shown a special grinding fixture for this operation. The comb blank is positioned on a rotary fixture 41 having a supporting surface 42 concentric with the center about which the fixture rotates and receding supporting surfaces 43 which receive an end portion of the blank. Retaining lugs 44 on the fixture engage in the openings 38 to hold the blank in the position shown. By proper rotative feed of the fixture with respect to a grinding wheel 45, the area 39 will be ground to the desired reduction. The grinding wheel is preferably faced to grind an area corresponding in width with that of the area 39. The grinding is done throughout the length of the supporting surface 42 designated by the dimension 45 and its operation is performed without taking the temper from the extremely thin steel section. The fixture 41 may be constructed to carry a series of comb plates for successive grinding operations. Following this the comb plate is perforated in a stamping operation to provide small openings 46 in the areas 28 within the thin section and teeth 47 in the thicker end areas 29. In the preferred embodiment the teeth 47 are then bent downwardly in a forming operation as shown in Fig. 18. Following this the entire undersurface or cutting side 48 is lapped or honed while this portion of the comb plate is flexed in an arc approximating that which it occupies in cooperation with a cutter, in this instance in the semi-cylindrical form in which it is held on the support 28. This lapping operation is not shown in the drawings as it is more fully disclosed in Patent No. 2,182,067, above mentioned. Following this the blank is punched to trim off the end portions to the shape 49 and to punch rivet openings 51 shown in dotted lines in Fig. 15. The cut-outs 52 and 53 register with similar shapes in the supporting frame for functions peculiar to the use of this comb unit.

Referring now to the manufacture of the supporting frame, Figs. 2 to 10, inclusive: In the preferred form of my invention this frame is formed of cold rolled steel of a relatively thick section, in this instance approximately .042" thick. This sheet material is first blanked to the shape 54 shown in Fig. 2 having longitudinal side members 55 joined by a series of cross members 56 the number and relative relation of which correspond with the imperforate areas joining the side portions of the comb plate. The blank 54 is then swaged by a stamping operation to provide recesses 57 and rivet bosses 58, the latter being extruded from one side of the blank substantially to the shape shown in Fig. 8. This rivet structure is the subject matter of said Patent No. 2,234,929, above mentioned. Following this a series of operations are performed by means of shaving dies (not shown). According to my invention these shaving dies are so constructed as to remove a slight amount of stock from all edge surfaces of the blank at each shaving operation. In the case of reducing the cross members to a thin section an equal amount of material is removed from each side of the member, whereby to equalize the shearing forces. In actual commercial practice the four cross members intermediate those at the extreme ends are blanked to a width of .080". The first shaving operation reduces these cross members to a width of .044" as shown diagrammatically in Fig. 4. The next succeeding shaving operations reduce these cross members to .026" and then to .018", as diagrammatically shown in Figs. 5 and 6, respectively. In each of these shaving operations the blank is located and held to a high degree of precision by means of only the rivet bosses 58 at the extreme ends of each row, that is, the four rivet bosses at the extreme corners of the blank. The utilizing of these rivet bosses for location purposes is shown in Fig. 9 in which the bosses at the opposite ends are located in complemental recesses 59 in a lower die member 61. By reason of this method of manufacture I am able to provide an extremely accurate structure in which the ultimate width of the narrow ribs is less than half the width of the ultimate thickness of these ribs, which in this case is also the ultimate thickness of the stock blank. Furthermore, as a consequence of this manufacture the component parts of the supporting frame have high tensile strength and the frame is free to be formed to the arched shape, that is, the semi-cylindrical form shown in Fig. 10 without the presence of internal stresses which might tend to cause deformation of shape in the ultimate article. In other words, by reason of the method of manufacture herein disclosed the supporting frame possesses high tensile strength and unchanging quality for supporting and maintaining the extremely thin comb plate in permanent shape. The finished blank shown in Fig. 6 is formed to the arched shape shown in Fig. 10 preferably by two forming operations such as rough forming and finish forming whereby extreme accuracy in the semi-cylindrical shape of the outer surface of the support is obtained.

Assembly of the comb plate and the supporting frame into a unitary structure will now be described, referring to Figs. 20 to 25, inclusive. The assembly is effected by means of special dies comprising essentially a lower and an upper die each having a multiple of parts. The dies are used in an ordinary punch press and after the comb plate and the support have been placed in the lower die by hand the upper die will be caused to move down in a working stroke by means of which a sequence of assembling operations are automatically performed, as will now be described. As shown in Fig. 20 the die block 62 carries a lower die made up of stationary parts 63, 64, 65. and 66 and movable parts 67 and 68. These parts are duplicated at opposite sides of the center line with the exception of part 64 which is disposed at the center. In Fig. 22 I have shown the die parts which engage the comb plate and the supporting frame in assembling the same, on a scale approximately four times actual size. It will be seen that the die part 64 has a semi-cylindrical cavity 69 to which the resilient comb plate is to be conformed in the ultimate assembly. This cavity 69 extends the full length of the comb plate. The operator places a finished comb plate in the cavity, with the cutting side up and forces it down until the longitudinal side edges spring into latch engagement beneath retaining fingers 71. In this instance there are four of these fingers 71 as shown in Fig. 21, the opposite pairs being carried by the movable die members 67 which I term "pushers." Each pusher die member carries a series of rivet plungers 72 each having a rivet forming head 73 and a striker head 74. The pusher die 67 extends the full length of the cavity 69 and has projecting cam lugs 75 at each end as shown in Fig. 21. In this view the stationary part 66 at the left hand side is removed to show the pusher part and the rivet striker heads. The parts 65 and 66 are normally held in fixed, stationary position by means of socket head bolts shown in Fig. 21. Several expansion springs 76 (only one of which is shown) interposed between a stationary part of the lower die and the pusher 67 serve to urge the latter outwardly to a retracted position limited by stops 77. The restricted face 78 of each pusher is on an arc conforming with the arc of the cavity 69 so that when the pusher member is moved forwardly this face 78 will push the marginal portion of the comb plate over the rivet bosses and into contact with the outer side of the supporting frame, assuming that the latter has been placed in position in the die as will be presently described. The pusher die members are moved forwardly by cam members 79 (Figs. 20 and 24) carried by the parts 81 of the upper die, these cam members being arranged to enter the openings 82 and engage against the projecting cam lugs 75 at the end of each pusher member. After the cam plate has been inserted in the lower die and retained therein as described, the operator places the supporting frame 28 in the cavity formed by the comb plate so as to nest therein, the support being confined against endwise displacement by the shoulders 83. The operator then causes the upper die designated generally by 84 to move down in an operating stroke. The first operation of the upper die is that of causing the equalizing die members 85 to engage the ends of the support in the manner shown in Fig. 23 and accurately locate or position this support with respect to the comb plate. It will be noted that the equalizing die members 85 are backed up by springs 86 and that a center die member 87 carried on a plunger member 88 is backed up by a spring 89. The die members 85 and 87 extend the full length of the support. The springs 86 are considerably lighter than the spring 89 and the parts are so proportioned and arranged that in the downstroke the members 85 function to position the support before any considerable pressure has been applied to the support by the center die member 87. Immediately following this the rivet plungers 72 are given a forceful striking blow by means of the movable cam members 68, above mentioned, which strike the heads 74 of the riveting plungers 72. These strikers 68 are mounted for sliding fit between the stationary die parts 63 and 65 and are normally urged to a retracted position by expansion springs 91. The cam striking action is effected by cams 92 on the upper die members 81 which are so arranged as to cause the striking action to take place at the proper moment in the cycle of operations. Each striker is held from endwise displacement by suitable means such as a fixed stop 93 (Fig. 21) located in a slot in the striker.

It will be observed that the rivet plungers 72 at the opposite sides are arranged in planes converging upwardly so that each plunger delivers a striking blow slightly in an upward direction, thereby tending to swage the boss toward an upper side. This spreads the metal of the boss in such manner that it impinges against the adjacent upper edge of the rivet hole in the cam plate and draws the plate tightly but without distortion against the peripheral surface of the support and its arched ribs, as shown in Figs. 25 and 26. The shape of the face of each plunger head 73 conforms substantially with the shape of the face of the rivet head shown in Fig. 26.

It will be apparent from the foregoing that upon completion of the operations above described the comb plate and the support are relatively positioned and held to a high degree of precision and the riveting operation is performed without distortion of the parts from the ultimate shape characteristics desired. Upon retraction of the upper die the movable parts of the lower die automatically retract under the influence of the springs 76 and 91 and the completely assembled comb unit is free to be removed.

Following this the comb unit is plated preferably by chrome plating to give it a permanent non-corrosive finish.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. Apparatus for making a comb unit which includes a comb plate and a supporting frame of the character described comprising, in combination, a lower cavity die for receiving the comb plate, an upper die having a work stroke for positioning the supporting frame nested in the comb plate, the lower die including pusher members slidable outwardly and inwardly with respect to the comb plate for moving the longitudinal marginal portions of the comb plate into coaction with the supporting frame, riveting plungers slidable on the pusher members for riveting the comb plate and the supporting frame one to the other, and means actuated by the upper die for operating said pusher members and said riveting plungers to perform their respective functions in said work stroke.

2. Apparatus as set forth in claim 1, in which the lower die includes a striker member coacting with each pusher member and slidable in the plane of such pusher member for moving the riveting plungers in the riveting stroke, and a cam face on the outer end of each striker member adapted to be engaged by the upper die to impart the riveting stroke.

3. Apparatus as set forth in claim 1, in which the upper die includes means for positioning the supporting frame to accurately locate its rivet bosses with respect to the rivet openings in the comb plate.

4. Apparatus for making a comb unit which includes in its structure a comb plate of thin steel and a supporting frame therefor having longitudinal side members joined by arched cross members and in which the comb plate is conformed to said arched members and retained on the supporting frame by rivet bosses located on the outer side of the longitudinal members and passing through openings in the comb plate and riveted thereto, said apparatus comprising, in combination, a lower die having a cavity adapted for receiving the comb plate arched downwardly, retaining fingers coacting with the die for engaging the longitudinal marginal edges of the comb plate to retain said comb plate arched in said cavity, said die cavity being substantially semi-circular in form corresponding with the desired ultimate shape of the comb plate and the retained marginal portions of the comb plate being flexed outwardly slightly beyond said shape, means for locating the supporting frame in the arched comb plate to accurately position the rivet bosses with respect to the rivet openings in the comb plate, and means for riveting the bosses over the outer side of the comb plate to thereby fixedly clamp said comb plate to the supporting frame while the comb plate and the supporting frame are held in said accurately positioned relation by said upper and lower dies.

5. Apparatus for making a comb unit as set forth in claim 4, in which the rivet bosses are swaged over by means of rivet hammers moving in upwardly converging planes to force the rivet bosses against the upper adjacent edges in the rivet openings and thereby draw the comb plate tightly against the outer surface of the arched supporting frame.

6. Apparatus for making a comb unit which includes in its structure a comb plate of thin steel and an arched supporting frame having longitudinal side members and in which the comb plate is conformed to the arched shape of the supporting frame and is retained thereon by rivet bosses stamped from said longitudinal members, said apparatus comprising, in combination, a lower die having a cavity for receiving the comb plate arched downwardly, retaining fingers coacting with the die and engaging the longitudinal marginal edges of the comb plate to retain said comb plate arched in said cavity, said die cavity being arched to a shape corresponding with the desired ultimate shape of the plate and the retained marginal portions of the plate being flexed outwardly slightly beyond said shape, an upper die for nesting the supporting frame in the arched comb plate and levelling said frame to accurately position the rivet bosses with respect to the rivet openings in the comb plate, and means for riveting the bosses over the outer side of the comb plate to thereby fixedly clamp the plate to the supporting frame while the comb plate and the supporting frame are held in said accurately positioned relation by said upper and lower dies.

7. Apparatus for making a comb unit which includes in its structure a comb plate of thin steel and an arched supporting frame having longitudinal side members and in which the comb plate is conformed to the arched shape of the supporting frame and is retained thereon by rivet bosses stamped from said longitudinal members, said apparatus comprising, in combination, a lower die having a cavity for receiving the comb plate arched downwardly and holding the longitudinal marginal portions projecting outwardly, an upper die for accurately locating the supporting frame nested within the comb plate by means including a plunger die having equalizing parts which engage the uppermost edges of the longitudinal side members, means for pushing the longitudinal marginal portions of the comb plate inwardly to seat against the outer face of the supporting frame with the rivet bosses extending through the rivet openings in the comb plate, and rivet hammers for swaging over the rivet bosses, said rivet hammers moving in upwardly converging planes to force the rivet bosses against the upper adjacent edges in the rivet openings and thereby draw the comb plate against the outer surface of the arched supporting frame.

8. Apparatus for making a comb unit which includes in its structure a comb plate of thin steel and an arched supporting frame to which the comb plate is conformed and interlocked by fastening means, said apparatus comprising, in combination, a lower die having an open top semicircular cavity for receiving the comb plate arched downwardly, retaining members for engaging the marginal longitudinal edges of the comb plate for holding it arched in the lower die, an upper die for holding the arched supporting frame nested in the arched comb plate, pusher die members for pressing said longitudinal marginal edge portions of the comb plate inwardly against the supporting frame, and plunger die members for imparting a striking blow to said fastening means to effect said interlocking of the comb plate and the comb support.

9. Apparatus for making a comb unit as set forth in claim 8, including means for levelling the supporting frame in the arched comb plate and maintaining the supporting frame in the levelled position at the time of the interlocking operation.

10. Apparatus for making a comb unit as set forth in claim 8, in which the described retaining members are carried by the pusher die members and move inwardly therewith.

11. Apparatus for making a comb unit as set forth in claim 8, in which the plunger die members are mounted to slide in the pusher die members in coacting relation therewith.

CHARLES L. MOLNAR.